United States Patent [19]

Kent

[11] 4,095,844
[45] Jun. 20, 1978

[54] SUPPORT STRUCTURE AND DRIVING MECHANISM FOR TILTING, SLIDING EDGE DISPENSERS

[76] Inventor: Loren W. Kent, 1239 E. Carlton Ave., Orange, Calif. 92667

[21] Appl. No.: 795,651

[22] Filed: May 10, 1977

[51] Int. Cl.² ............................................. B60P 1/32
[52] U.S. Cl. .................................... 298/14; 214/313; 298/27; 105/260
[58] Field of Search .................. 298/11, 12, 13, 14, 298/17.6, 17.8, 18, 27; 214/313, 502; 105/260, 268, 269

[56] References Cited

U.S. PATENT DOCUMENTS

| 2,078,332 | 4/1937 | Le Tourneau | 298/27 |
| 3,944,284 | 3/1976 | Kent | 298/14 |

FOREIGN PATENT DOCUMENTS 863,954  1/1953  Germany ............................. 298/17.8

Primary Examiner—L. J. Paperner
Attorney, Agent, or Firm—Raymond L. Madsen

[57] ABSTRACT

There is disclosed an improvement for a tilting, sliding edge dispenser having pivot members fixedly attached to opposite ends of the dispenser and a rigid support structure having elongated receptacles for receiving the pivot members in rotating sliding engagement. Each one of a pair of elongated driving loops is attached adjacent one end, respectively, of a linear edge of the dispenser and is stretched over a pair of wheels attached to each end of a base member and driven by a motor attached to a shaft connecting one wheel of each pair of wheels whereby the linear edge is driven across the surface of the base members to dispense the contents of the dispenser.

11 Claims, 6 Drawing Figures

SUPPORT STRUCTURE AND DRIVING MECHANISM FOR TILTING, SLIDING EDGE DISPENSERS

The present invention relates generally to improvements in tilting, sliding edge dispensers and the like and more particularly to new and improved support structures and drive mechanisms for tiling, sliding edge dispensers wherein the support structure is rigidly attached to a base member having a planer surface thereon and wherein the tilting, sliding edge dispenser is moved by a driving mechanism connected to each end of the sliding edge.

The present invention is an improved over applicant's invention described in U.S. Pat. No. 3,944,284, wherein there is described a tilting, sliding edge dispenser supported by rotating or pivoting arms of fixed or telescoping length with the linear sliding edges of the dispenser being driven by lugs which engage cut outs or openings along the edges and which are attached to cable which traverse the surface of the base member and around pulleys to a drive mechanism.

The disadvantages of the supporting structure and cable-driving system of U.S. Pat. No. 3,944,284 are that the pivoting or rotating fixed length and telescoping support arms lack mechanical strength and stability. Furthermore the cable drive utilizes lugs attached to the cable which must pass over the pulley wheels and engage pivoting lugs engaging members mounted on the linear sliding edge of the dispenser. The present invention overcomes these disadvantages.

The general purpose of this invention is to provide a tilting, sliding edge dispenser which embraces all the advantages of the tilting, sliding edge dispenser described in U.S. Pat. No. 3,944,284 and possess none of the aforedescribed disadvantages. To obtain this, the present invention contemplates a unique support structure rigidly attached to the base member and a driving mechanism attached to each end of each linear sliding edge whereby mechanical weakness and instability as well as a cable drive system using cable lugs are avoided.

An object of the present invention is the provision of a rigid supporting structure for a tilting, sliding edge dispenser which allows the dispenser to slide across the planar surface of base member and tilt simultaneously to dispense the contents therefrom.

Another object is to provide a rigid supporting structure for a double-acting tilting, sliding edge dispenser which permits the contents of the dispenser to be removed therefrom, on either side of a vehicle or base member, by the positive action of a scraping and sliding edge of the container.

A further object of the invention is the provision of a driving mechanism which moves the sliding edge of a tilting, sliding edge dispenser across a base member by driving the dispenser at each end of the linear sliding edge thereof.

Still another object is to provide a driving mechanism for a tilting, sliding edge dumping container for a vehicle which mechanism is pivotally connected to each end of two linear sliding edges of the dumping container whereby the contents of the container may be dispensed on either side of the vehicle.

Other objects and many of the attendant advantages of the invention will be readily appreciated as the same becomes better understood by reference to the following detailed description when considered with the accompanying drawings in which like reference numerals designate like parts throughout the figures thereof and wherein.

Figure 1:
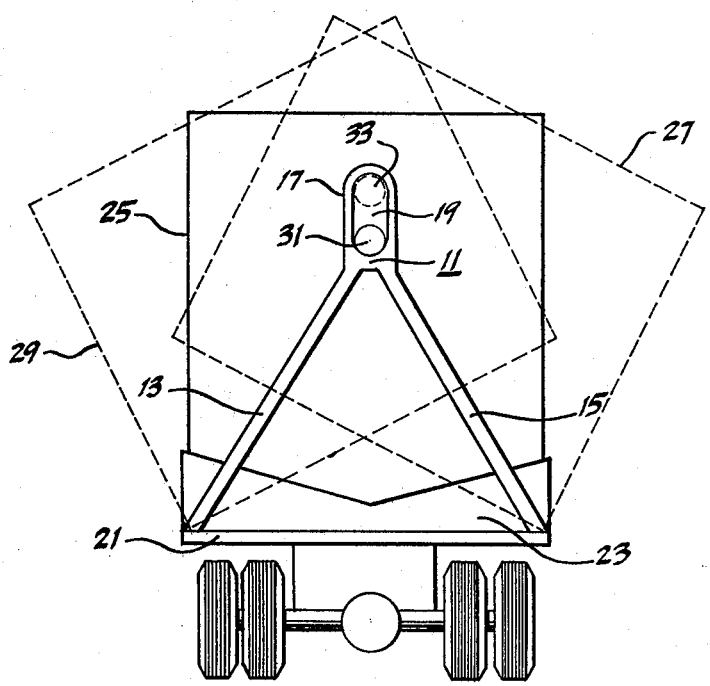
FIG. 1 illustrates the rear view of a vehicle with a preferred embodiment of the rigid supporting structure of the present invention mounted thereon.

Referring now to the drawings wherein like reference characters designate like or corresponding parts throughout the several views, there is shown in FIG. 1 (which illustrates a preferred embodiment of the rigid support structure of the present invention) a frame member 11 having a pair of arms 13 and 15 joined at one end thereof to form an inverted "V", the apex of the "V" having a slotted section 17 extending therefrom with an elongated slot 19 therein. The end of arm 13 opposite the apex of the "V" is connected to one side of a base member 21 having a planer surface thereon (such as the flat bed of a vehicle or truck) and the corresponding end of arm 15 is attached to the opposite side of base member 21. An end panel 23 is attached along the edge of base member 21 between the unjoined ends of arms 13 and 15. A tilting, sliding edge dispenser or container 25 tilts in one direction to a position designated by a dashed rectangle 27 with one sliding edge moving from left to right to a position adjacent the one edge of base member 21 and tilts in the opposite direction to a position shown by a dashed rectangular line 29 with the opposite sliding edge moving from right to left to a position adjacent the opposite edge of base member 21. The tilting occurs about a pivot member or cylindrical bearing surface 31 projecting from the exterior surface of container 25, pivot member 31 being rotatably and slidingly engaged in elongated slot 19. A dashed circle 33 within slot 19 illustrates the extremity of motion of pivot member 31 in slot 19 as container 25 tilts, slides and rotates between positions 27 and 29.

Figure 2:
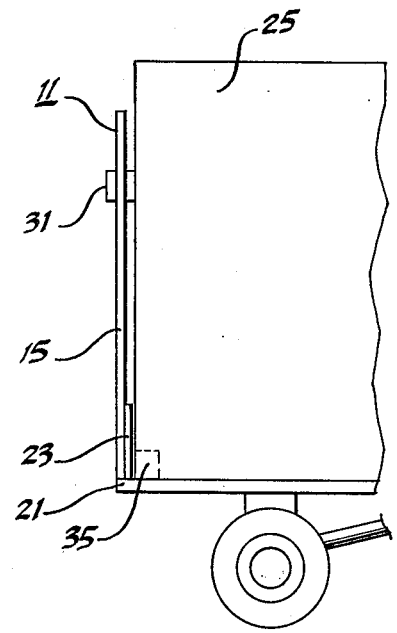
FIG. 2 shows a side view, partially cut-away of the rear of a vehicle with the supporting structure of FIG. 1 mounted thereon.

FIG. 2 shows a side view partially cut away of the support structure of FIG. 1. Support structure of frame member 11 has arm 15 thereof rigidly connected to one edge of base member 21 and end panel 23 connected to base member 21 between arm 15 and dispensing container 25. Pivot member 31 projects from the exterior surface of dispensing container 25 through elongated slot 19 (not illustrated). Rectangular dashed line 35 the end of a rectangular channel (not visible) which is constructed to receive a driving mechanism for sliding and tilting container 25.

Figure 3:
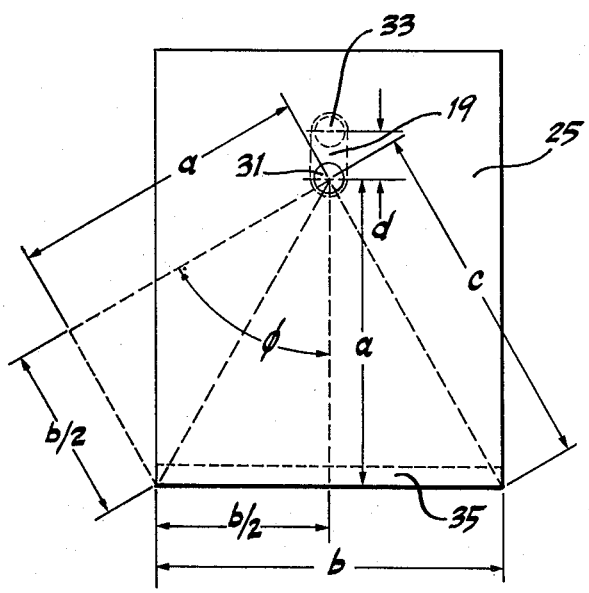
FIG. 3 illustrates the pivot displacement and angular tilt of the sliding container of FIG. 1.

FIG. 3 illustrates the dimension and angular relation of the tilting and sliding displacement of container 25. Pivot member 31 moves vertically to position 33 shown by a dashed circular line within elongated slot 19 indicated by a dashed elongated loop around pivot member 31. The vertical distance between the center of pivot member 31 and the base edge of the end surface of tilting edge dispenser 25 is designated as "*a*". The distance between the center of pivot member 31 and each of the lower or bottom corners of the end surface of tilting dispenser container 25 is designated as "*c*". The length of the base edge of the end surface of dispensing container 25 is designated as "*b*". The maximum angle of tilt of dispensing container 25 is designated as angle $\phi$. Channel 35 into which the driving mechanism is attached is shown between the base edge of the end surface and the parallel dashed line adjacent the base edge.

Figure 4:
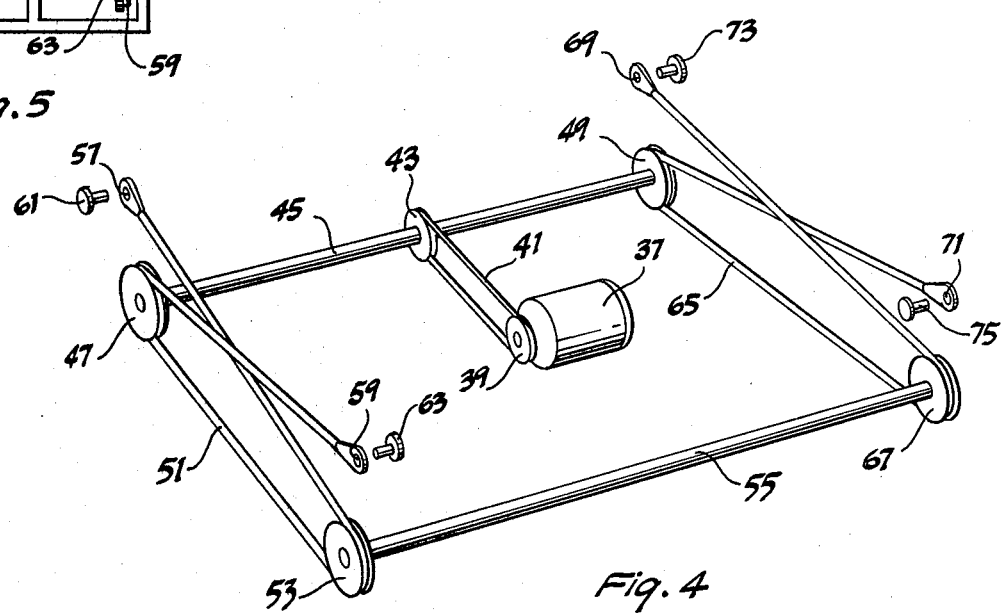
FIG. 4 illustrates a perspective view of the preferred embodiment of a bi-directional driving mechanism for the tilting container of FIG. 1.

In FIG. 4, a motor 37 having a pulley or sprocket wheel 39 thereon is connected by a flexible loop comprising a cable or driving chain 41 to a pulley wheel or sprocket wheel 43 which in turn is connected by a shaft 45 to pulley or sprocket wheels 47 and 49, respectively, at each end thereof. A flexible loop comprising a cable or chain 51 traverses a pulley or sprocket wheel 47 and engages a pulley or sprocket wheel 53 which in turn is connected to a shaft 55. The one end of cable or chain 51 has a connector 57 with an opening therein adapted to receive a pivot bolt 61 and the other end of chain or cable 51 has a connector 59 with an opening therein adapted to receive a pivot bolt or pin 63. The other end of shaft 55 is connected to a pulley or sprocket wheel 67 which is engaged by a flexible loop comprising a cable or chain 65 which in turn engages pulley or sprocket wheel 49 attached to shaft 45. One end of cable or chain 65 is connected to a connector 69 having an opening therein adapted to receive a pivot bolt of pin 73 and the other end having a connector 71 with an opening therein adapted to receive a pivot bolt or pin 75.

Figure 5:
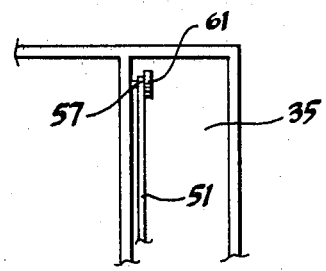
FIG. 5 illustrates a cut-away bottom view of a channel in the tilting edge container of FIG. 1 for receiving the driving mechanism of FIG. 4.
Figure 5:
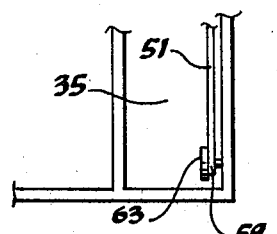

FIG. 5 illustrates a cut-away bottom view of channel 35 which is constructed to receive pivot pin or bolt 61 into the side thereof to pivotally fasten connector 57 of cable 51 to the side of channel 35 adjacent one end thereof. Similarly, pivot bolt or pin 63 is fastened to the side of channel 35 pivotally attaching connector 59 to the side of channel 35 adjacent the other end thereof.

Figure 6:
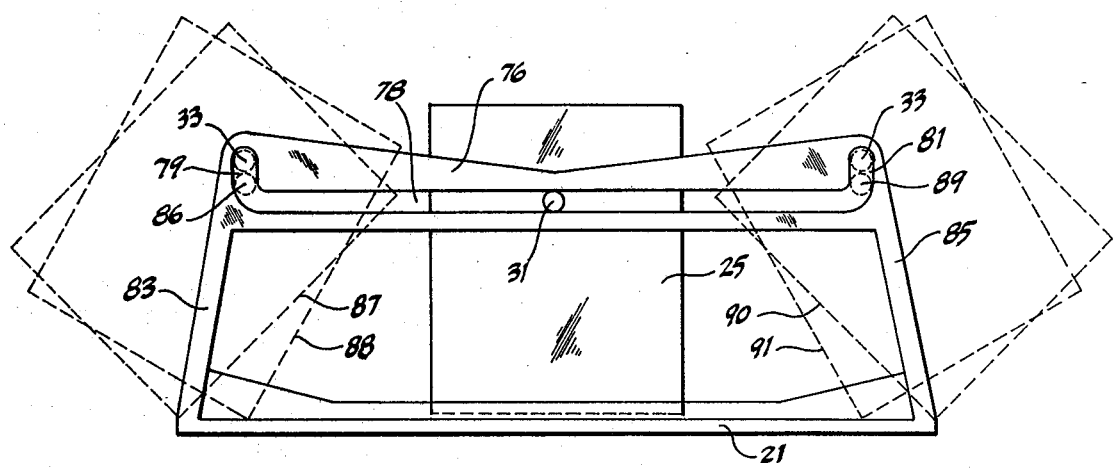
FIG. 6 shows an alternate version of the rigid supporting structure of FIG. 1 to allow horizontal motion of the pivot point.

In FIG. 6, a horizontal slotted section 76 of a support structure has an elongated slot 78 therealong with two vertical slot segments 79 and 81 at either end, respectively of slotted section 76 to permit vertical displacement of pivot member 31 to its maximum height position 33 at either end of slotted section 76 as container 25 is tilted into position 88 and 91, respectively, in response to pivot member 31 entering segment 79 or 81, respectively. As the container is moved from left to right from its central position on base member 21, pivot member 31 will rise to position 33 in vertical slot segment 79 and then drop downwardly as the sliding edge continues to move toward the edge of base member 21. Pivot member 31 drops into position 86 and 89, respectively, in segments 79 and 81, respectively, as the sliding edge is further moved toward the right to tilt container 25 into positions 87 and 90, respectively, at which time the container sliding edge will be stopped from further motion to prevent member 31 from dropping back into slot 78 thereby making it impossible to return the container to its upright position when its motion is reversed.

To return the container to its original position, the motion of the container described above in connection with FIG. 6 is reversed, respectively, from either end.

It should be noted that the structure of FIG. 6 may have horizontal slot 78 with only one vertical segment at the end thereof and, consequently, may be limited to dump from only one side.

Although a particular slot shape is shown in FIG. 6, it should be understood that other shapes are contemplated and may be utilized to suit the needs of the designer to accomplish given requirements for motion of the container.

It should be understood that, although only one support structure 11 is illustrated in FIG. 1, that a support structure is located at each end surface of container 25 and that a cylindrical bearing surface 31 projects from each end surface, the axis of each bearing surface 31 being common and coincident and parallel to each sliding edge of container 25 and the planer surface of base member 21 such that when container 25 tilts and rotates about the common and coincident axes of the end cylindrical bearing surfaces, the sliding edges are maintained in contact with the planar surface of base member 21.

Operation of the invention can best be described by turning attention first to the driving mechanism of FIG. 4. Connectors 57 and 59 are located in channel 35 along the base edge of dispensing container 25. Similarly connector 69 and 71 connected to cable 65 are located in an identical channel along the other base edge of container 25. As motor 37 rotates drive shaft 45, flexible loop or cable 51 is caused to move as well as flexible loop or cable 65. Assuming the direction of motor 37 is such that connector 71 and connector 59 are moved from left to right in FIG. 4, the sliding edge therebetween is moved across the planar surface of base member 21 of FIG. 1. As the edge moves across the planar surface the opposite sliding edge to which connectors 57 and 69 are attached moved upwardly as container 25 of FIG. 1 tilts. As the sliding edge located between connectors 59 and 71 moves across planer surface 21, cables 51 and 65 contact and engage the ends of channel 35 adjacent thereto as connectors 57 and 69 move upwardly with the tilting of the container and the rising of the opposite edge.

Similarly, if the motor is reversed connectors 57 and 69 pull the sliding edge therebetween across planer surface of base member 21 while cables 51 and 65 intersect the ends of the respective channels 35 as the sliding edge between connectors 59 and 71 tilts upwardly away from the planer surface of base member 21.

Turning now to FIG. 1, dashed lines 27 and 29 indicate the extreme positions of dispensing container 25. The maximum angle of tilt is designated as angle $\phi$ in FIG. 3. Angle $\phi$ is equal to $2 \sin^{-1}(b/2a)$ where "*b*" is the dimension of the edge of the base end of dispenser 25 and "*a*" is the distance between the center of the pivot member 31 and the base edge of the end of dispenser 25. The dimension "*d*" illustrated in FIG. 3 is the distance that pivot member 31 moves vertically in slot 19 and is equal to the difference between dimension "*c*" and dimension "*a*" in FIG. 3.

Turning now to FIG. 1, as a driving mechanism, such as illustrated in FIG. 4, moves the container 25 toward position 29, pivot member 31 slides upwardly in slot 19 to a maximum height when the sliding edge is in contact base member 21 is directly below pivot member 31 and drops down into its original position as the sliding edge continues across base member 21 to place container 25 in the position shown by dashed line 29.

Each end of dispenser or container 25 has a pivot member 31 located thereon with cylindrical surfaces to engage a corresponding slot 19 of a support structure or frame member 11. The axis of pivot member 31 at each end of dispenser 25 are coincident with each other and form a line which is parallel to each sliding edge of dispenser 25. Therefore, as each sliding edge of dispenser 25 is moved across the planar surface of base member 21, pivot members 31 slide and rotate in respective slots 19 of corresponding frame members 11, always maintaining the sliding edge in linear contact with the planer surface of base member 21.

Panel 23 illustrated in FIG. 1 prevents the contents of container 25 from being dispensed out of the ends thereof as container 25 is tilted. A panel 23 is located at each end of the tilting dispenser.

Although a cable or chain driving system is disclosed for a double sliding edge tilting container, it should be evident that a single sliding edge container may also be driven by the chain or cable drive system illustrated by having the end connectors such as connectors 57 and 59 of cable or chain drive 51 connected to the same end of the sliding edge by a single pivot bolt or pivot pin. Similarly cable 65 with connectors 69 and 71 would be joined to the opposite end of the single sliding edge by a single pivot bolt or pivot pin.

It now should be apparent that the present invention provides a rigid mechanical support structure of frame members along with a mechanical drive system which may be employed in conjunction with a sliding, tilting edge dispenser for dispensing the contents thereof by sliding and tilting the container with respect to a base member whereby the supporting structure is rigidly attached to the base member to provide a strong mechanical support for the tilting dispenser and whereby the driving mechanism is firmly and pivotally attached to each end of the sliding edges of the tilting dispenser.

Although particular structural elements have been discussed in connection with a specific embodiment of a dispensing mechanism and apparatus constructed in accordance with the teachings of the present invention, others may be utilized. Furthermore, it will be understood that although an exemplary embodiment of the present invention has been disclosed and discussed, other applications and mechanical arrangements are possible and that the embodiments disclosed may be subject to various changes, modifications, and substitutions without necessarily departing from the spirit of the invention.

What is claimed is:

1. In combination with a tilting, sliding edge dispenser wherein a base member with a flat planer surface has a container with at least one opening normally closed by the planer surface when the container is in a first position relative to the base member, and wherein a portion of at least one opening has at least one linear edge, wherein the container is adapted to move across the planer surface in tilting engagement therewith from the first position to a second position while maintaining the linear edge in sliding contact with the planer surface to scrape the contents of the container before the linear edge and thereby dispense the contents therefrom, the improvement comprising:
   pivot means fixedly attached to the containers; and
   a support structure rigidly attached to the base member and having elongated receptacle means for receiving said pivot means in rotating and sliding engagement therewith whereby said pivot means slides and rotates in said receptacle means as the container moves from the first position to the second position across the planer surface in tilting engagement therewith.

2. The improvement described in claim 1 wherein said pivot means is a pair of cylindrical bearing surfaces oppositely disposed on and projecting from the exterior surface of the container, each of said cylindrical bearing surfaces having an axis of symmetry coincidental with the axis of symmetry of the other cylindrical bearing surfaces, said pair of cylindrical bearing surfaces being positioned on the container to align said axis of symmetry parallel to the linear edge of the container.

3. The improvement described in claim 2 wherein said support structure is a pair of frame members, each member being rigidly mounted on the base member adjacent a corresponding cylindrical bearing surface on the container and wherein said elongated receptacle means is a slot opening in each of said frame members adapted to receive said corresponding cylindrical bearing surface in sliding and rotating engagement therein.

4. The improvement described in claim 1 further including driving means comprising:
   a pair of elongated flexible driving loops, each one of said pair of loops having one point thereon rotatably attached adjacent one end, respectively, of the linear edge of the containers;
   two pairs of wheels rotatably mounted on the base member, each of said two pairs of wheels exclusively being adapted to receive and engage one of said pair of elongated flexible drive loops, the wheels of each of said pairs of wheels being spaced apart in tandem and being located on the base member such that the corresponding end of the linear edge of the container substantially moves between said wheels of each of said pairs of wheels as the container moves across the base member the first and second positions; and
   means for driving said pair of elongated flexible driving loops whereby the linear edge of the container is driven across the planer surface of the base member thereby moving the container between the first and second positions.

5. The improvement described in claim 4 wherein said pair of elongated flexible loops is a chain loop and wherein said pairs of wheels are pulley wheels wherein said means for driving comprises a drum to which said cable is coupled and a motor for driving said drum.

6. The improvement described in claim 4 wherein each of said pair of elongated flexible loops is a chain loop and wherein said two pairs of wheels are sprocket wheels with teeth thereon for engaging a chain and wherein said means for driving comprises:
   a rotating shaft fixedly interconnected between one sprocket wheel in each of said two pairs of wheels; and
   a motor coupled to said shaft for rotating said shaft and sprocket wheels connected thereto.

7. In combination with dispensing apparatus where a base member with a planer surface has a container for holding dispensible contents located thereon with at least one opening normally closed by the planer surface when the container is in a first position, and wherein the at least one opening has first and second linear edges and wherein the container is adapted to be moved across the base member in tilting engagement therewith from the first position to a second position while maintaining the first linear edge in sliding contact with the planer surface of the base member and from first position to a third while maintaining the second linear edge in sliding contact with planer surface of the base member, the improvement comprising:
   pivot means fixedly attached to the exterior of the container; and a support structure rigidly attached to the base member having elongated receptacle means for receiving said pivot means and rotating and sliding engagement therein whereby said pivot slides and rotates in said receptacle means as the container moves from the first position to the second and third positions, respectively, across the planer surface in tilting engagement therewith.

8. The improvement described in claim 7 wherein said pivot means is a pair of cylindrical bearing surfaces oppositely disposed on a projection from the exterior surface of the container, each of said pair of cylindrical bearing surfaces having an axis of symmetry coincident with the axis of symmetry of the other cylindrical bearing surface, said pair of cylindrical bearing surfaces being positioned on the container to align said axis of symmetry parallel to the first and second linear axis of the container.

9. The improvement described in claim 8 wherein said support structure is a pair of frame members, each member being rigidly mounted on the base member adjacent a corresponding cylindrical bearing surface on the container and wherein said elongated receptacle means is a slot opening in each of said frame members adapted to receive said corresponding cylindrical bearing surface in sliding and rotating engagement therein.

10. The improvement described in claim 7 further including driving means, comprising:

a pair of elongated flexible driving loops, one of said pair having one end thereof rotatably attached adjacent one end of the first linear edge of the container and the other end thereof rotatably attached adjacent the other end of the first linear edge of the container and the other said pair having one end thereof rotatably attached adjacent one end of the second edge of the container and the other end thereof rotatably attached adjacent the other end of the second linear edge of the container;

two pairs of wheels rotatably mounted on the base member, each of said two pairs of wheels exclusively being adapted to receive and engage one of said pairs of elongated flexible driving loops, the wheels of each of said pairs of wheels being spaced in part in tandum and being located on the base member such that the corresponding ends of the first and second linear edges of the container substantially move between said wheels of each of said pairs of wheels as the container moves across the base member between the first and second and the first and third positions, respectively; and driving means for driving said pair of elongated flexible driving loops whereby the first and second linear edges of the container, respectively, are driven across the planer surface of the base member thereby moving the container between the first and second and the first and third positions, respectively.

11. The improvement described in claim 10 wherein said pair of elongated driving loops are chains and wherein the wheels of said two pairs of wheels are sprockets and wherein said driving means comprises:

a rotating shaft fixedly connected to one wheel of each of said two pairs of wheels;

a driving sprocket fixedly connected to said rotating shaft; and a motor coupled to said driving sprocket for rotating said shaft.

* * * * *